No. 739,269. PATENTED SEPT. 15, 1903.
J. A. TILDEN.
METER.
APPLICATION FILED MAY 8, 1903.
NO MODEL.
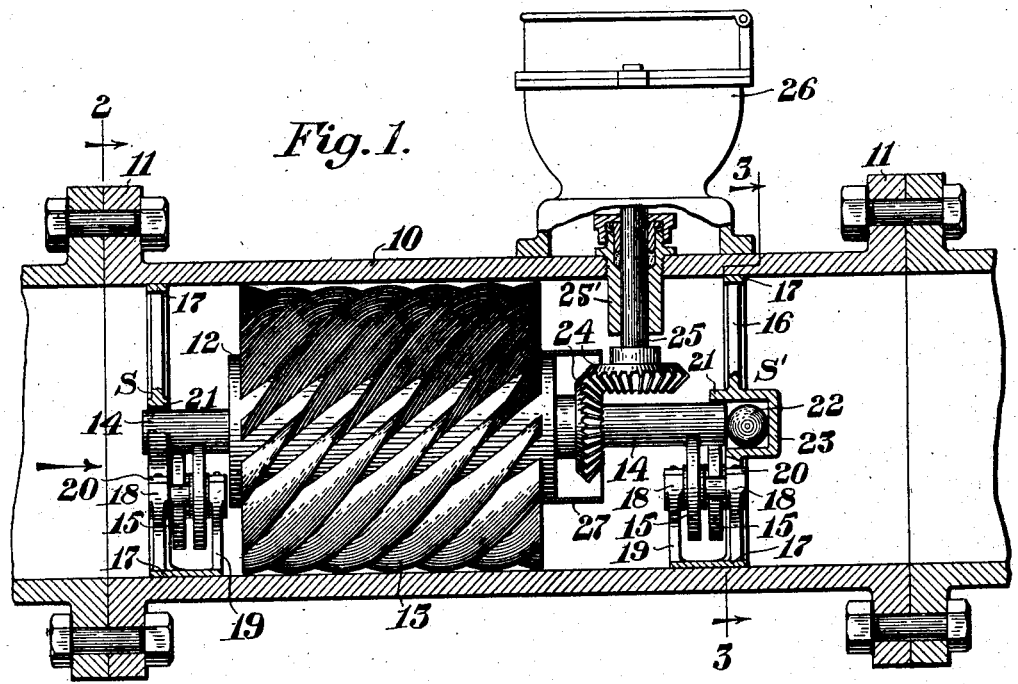
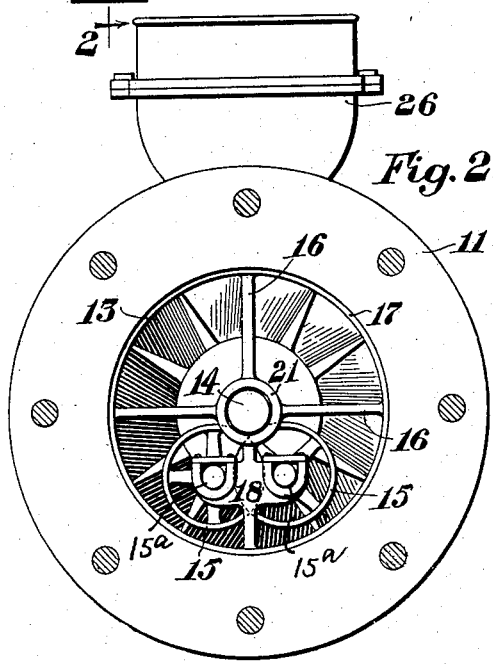
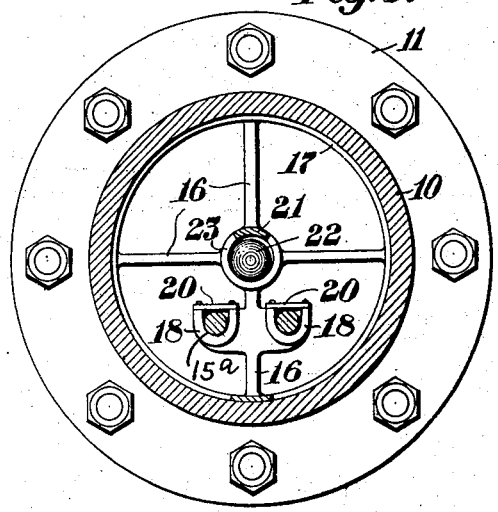
Witnesses:
Charles F. Logan.
Ella M. Cobb.
Inventor:
James A. Tilden,
by Sylvanus H. Cobb.
Atty.

No. 739,269. Patented September 15, 1903.

UNITED STATES PATENT OFFICE.

JAMES A. TILDEN, OF HYDEPARK, MASSACHUSETTS.

METER.

SPECIFICATION forming part of Letters Patent No. 739,269, dated September 15, 1903.

Application filed May 8, 1903. Serial No. 156,168. (No model.)

*To all whom it may concern:*

Be it known that I, JAMES A. TILDEN, a citizen of the United States, residing at Hydepark, in the county of Norfolk and State of Massachusetts, have invented certain new and useful Improvements in Meters, of which the following is a specification.

My invention relates to meters, and more particularly to that class of liquid-meters in which the measuring device is supported upon a horizontal spindle.

It consists of the various features hereinafter described and more particularly claimed.

In the accompanying drawings, Figure 1 is a central vertical longitudinal section through one embodiment of my invention. Fig. 2 is a full transverse section therethrough on the line 2 2 of Fig. 1, and Fig. 3 is a similar view on the line 3 3 of Fig. 1. All sections are taken in the direction indicated by the arrows.

Similar characters indicate like parts throughout the several figures of the drawings.

In meters designed to measure large quantities of such liquids as water a very convenient form to employ is one of the "current" type—as, for example, that in which the velocity of flow is determined by the speed of rotation of a propeller or screw. Under many conditions the most desirable arrangement to employ would be that in which the spindle supporting the measuring device extends horizontally; but here is encountered the difficulty of maintaining the bearings in proper condition, since they are liable to collect the gritty matter carried by the liquid and to become clogged and worn thereby. This destroys the accuracy of the measurement and may even completely stop the meter, either by the resistance in the bearings or their becoming so worn at the lower side that the screw sinks into contact with the casing. To avoid these difficulties, such current-meters are commonly made with the main spindle occupying a vertical position, the bearings therefor being such that they may be more readily kept free from dirt, while any wear which occurs does not affect the lateral position of the measuring device. This vertical spindle, however, particularly in meters intended for insertion in horizontal runs of pipe, necessitates a very awkward and undesirable arrangement of casing or connections. My present invention provides a meter free from all these objections.

The numeral 10 designates a suitable meter-casing, here shown as of generally cylindrical form and having its ends flanged at 11 11 to adapt it for insertion in similarly-flanged piping. Within the casing is the measuring device, which, as illustrated, consists of a body 12, having projecting from it helical ribs 13, extending into close proximity with the inner wall of the casing. This propeller or screw is mounted upon a substantially horizontal central spindle 14, which is in turn rotatably supported upon bearings so formed as to permit some lateral movement and free passage therethrough of the liquid to be measured. In the present instance these bearings consist of pairs of preferably overlapping rolls 15 15, shown in the form of open wheels with separated arms, to minimize resistance to the flow, from each side of which project journals 15ª. These rolls are supported beneath the spindle conveniently upon spiders S S', formed by arms 16, projecting from rings 17, coacting with and adapted to be removably secured to the inner wall of the casing at the inlet and outlet ends, respectively, of the measuring device. Each of the roll-bearings 18 upon the arms 16 and auxiliary arms 19 is so formed that some lateral play of the roll-journals therein is allowed, excessive movement or displacement being prevented by suitable caps 20. Above each pair of rolls is preferably provided retaining means for limiting the movement of the main spindle, it being here shown as a contact portion 21. This may be in the form of a ring constituting the center of the spider, sufficiently removed to permit the desired lateral movement of said spindle, yet in close enough proximity to prevent displacement or contact of the measuring device with the casing. To take the thrust of the spindle in the direction of the flow of the liquid, a bearing is provided at the eduction end, which may conveniently consist of a ball 22, mounted, preferably, with a capability for some lateral play in a suitable cup 23, supported upon this spider S' and contacting with a plane face at the end of the spindle. The rotation of the measuring device may be transmitted through bevel-gearing 24 to a vertical spindle 25, preferably journaled in a removable sleeve 25', extending through the meter-casing and suitably connected with registering mechanism contained in a register-casing 26, carried by the meter-casing. The gearing 24 may be conveniently located between the propeller and the spider S' and sufficiently near the former to be somewhat removed from the influence of the current. It may be further protected from the current and from the entrance between the intermeshing gears of wear-producing particles by a member or flange 27, conveniently projecting from the body 12 for a considerable distance over the gearing. It is evident that thus encircled there will be little tendency for dirt to gather upon the contact-faces, but that it will instead be deflected by the flange and carried on by the liquid-flow.

It will be seen that each of the main spindle-bearings in my improved meter is practically entirely open to free passage of the fluid to be measured, the spindle contacting therewith along a single line upon each roll, and that therefore no material will tend to lodge therein. Moreover, at the point where accumulation would be most liable to occur—the lower portion of the bearing—an open space is formed between the rolls. If hard abrasive particles should by chance pass between the spindle and rolls, the former is free to move laterally, and will thus ride over them without appreciable wear. As upon the roll-bearings the load is divided, they are less liable to wear; but they also to a large extent present the same advantages of clearing liquid-flow and lateral movement. It is evident that in addition to the above-mentioned novel functions this form of bearing will present the well-known advantage of freedom from frictional resistance of the roller-bearing. The end ball-bearing receives the thrust with but little resistance or wear and is able to clear itself and distribute any wear which may occur by its side play. Each spider furnishes a support common to all the bearing members at that end of the casing, permitting them to be conveniently introduced and secured in place or removed. The simple cylindrical casing without integral internal projections may be formed from a piece of pipe and the whole structure be very economically made and assembled.

Having thus described my invention, I claim—

1. A meter comprising a casing, a measuring device therein having a substantially horizontal supporting-spindle, bearings for the spindle consisting of pairs of rotatable rolls provided with journals, and bearings for the roll-journals through which passage of the fluid to be measured is permitted.

2. A meter comprising a casing, a measuring device therein having a substantially horizontal supporting-spindle, bearings for the spindle consisting of pairs of rotatable rolls provided with journals, and bearings for the roll-journals which allow sufficient lateral movement thereof to permit their riding freely over abrasive particles.

3. A meter comprising a casing, a measuring device therein having a substantially horizontal supporting-spindle, bearings for the spindle in which it is allowed lateral movement, and a thrust-bearing for one end of the spindle including a laterally-movable member contacting therewith.

4. A meter comprising a casing, a measuring device therein having a substantially horizontal supporting-spindle, bearings for the spindle in which it is allowed lateral movement, a thrust-bearing for one end of the spindle including a cup, and a ball laterally movable in the cup and contacting with the spindle.

5. In a meter, the combination with a cylindrical casing, of a measuring device therein having a substantially horizontal spindle, a ring coacting with the casing, arms projecting from the ring, and rolls journaled in the arms and serving as bearings for the spindle.

6. In a meter, the combination with a cylindrical casing, of a measuring device therein having a substantially horizontal spindle, a ring coacting with the casing, arms projecting from the ring and forming a spider, rolls journaled in one of the spiders beneath the spindle, and an element carried by the spider extending over said spindle in proximity but out of contact therewith.

7. In a meter, the combination with a measuring device, of a main spindle therefor, a second spindle, gearing connecting said spindles, and a flange projecting from the measuring device over the gearing.

8. In a meter, the combination with a casing, of a measuring device therein, a substantially horizontal main spindle for the measuring device, a second spindle, gearing connecting said spindles and situated in proximity to the measuring device at the eduction end of the casing, and a protecting member extending over the gearing.

9. A meter comprising a continuous and internally-cylindrical casing of uniform bore, a plurality of removable rings therein fitting the bore and carrying supporting-bearings, an independent thrust-bearing carried by one of the rings, and a measuring device supported upon and coacting with the bearings.

Signed at Boston, in the county of Suffolk and State of Massachusetts, this 30th day of April, 1903.

JAMES A. TILDEN.

Witnesses:
HENRY S. WINTON,
FRANCIS C. HERSEY, Jr.